(12) United States Patent
Ruiter

(10) Patent No.: US 11,772,471 B2
(45) Date of Patent: Oct. 3, 2023

(54) OPEN ROOF CONSTRUCTION FOR A VEHICLE AND WIND DEFLECTOR ASSEMBLY

(71) Applicant: INALFA ROOF SYSTEMS GROUP B.V., Oostrum (NL)

(72) Inventor: Matheus Simon Wilhelmus Ruiter, Melick (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 0 days.

(21) Appl. No.: 17/484,770

(22) Filed: Sep. 24, 2021

(65) Prior Publication Data

US 2022/0097506 A1 Mar. 31, 2022

(30) Foreign Application Priority Data

Sep. 25, 2020 (EP) .................................... 20198276

(51) Int. Cl.
*B60J 7/22* (2006.01)
*B60J 7/043* (2006.01)

(52) U.S. Cl.
CPC .................. *B60J 7/22* (2013.01); *B60J 7/043* (2013.01); *B60J 7/0435* (2013.01)

(58) Field of Classification Search
CPC ............. B60J 7/22; B60J 7/043; B60J 7/0435
(Continued)

(56) References Cited

U.S. PATENT DOCUMENTS 7,152,917 B2 * 12/2006 Manders .................... B60J 7/22
296/217
9,004,584 B1 * 4/2015 Cadena ...................... B60J 7/22
296/217
2016/0316920 A1 11/2016 Leipziger

FOREIGN PATENT DOCUMENTS

DE 102004052715 A1 5/2006
DE 102007053079 B3 * 10/2008 ................ B60J 7/22
(Continued)

OTHER PUBLICATIONS

Faerber et al., "Wind deflector for retractable vehicle roof, has adjustable cover element and extendable deflector element made from flexible laminar material", Publication: Feb. 11, 2010, German Patent Office, Edition: DE-102008034491-A1 (Year: 2010).*
(Continued)

*Primary Examiner* — Dennis H Pedder
*Assistant Examiner* — Joyce Eileen Hill
(74) *Attorney, Agent, or Firm* — Westman, Champlin & Koehler, P.A.; Steven M. Koehler

(57) ABSTRACT

An open roof construction for a vehicle comprises a panel for a roof opening and a wind deflector assembly positioned at the front edge of the roof opening. The wind deflector assembly is provided with a substantially rigid upper frame member extending at least along the front edge. A flexible member connects with an upper edge to said upper frame member and with a lower edge to a stationary part. The upper frame member is movable by an operating mechanism between a lower, inactive position and at least two upper, active positions. Tensioning members keep the flexible member taut over in all active positions, and is provided with a substantially rigid, elongate lower frame member at its lower edge. The lower frame member connects to the stationary part through the tensioning members having a
(Continued)

maximum tension force which is substantially lower than a maximum operating force of the operating mechanism.

20 Claims, 7 Drawing Sheets

(58) Field of Classification Search
USPC .............................................. 296/217, 180.1
See application file for complete search history.

(56) References Cited

FOREIGN PATENT DOCUMENTS

| DE | 102007053079 | B3 | 10/2008 | | |
|----|--------------|----|----|----|----|
| DE | 102008034491 | A1 | * | 2/2010 | ................ B60J 7/22 |

OTHER PUBLICATIONS

Degenhardt et al., "Air deflector fhas clamping frame with free ends that are movable following translatory shift of piece in vehicle vertical direction, during displacement ofclamping frame from rest position into operating position", Publication: Sep. 10, 2008 Edition: DE-102007053079-B3 (Year: 2008).*

European Search Report for corresponding European patent application No. 20198276.6 dated Mar. 10, 2021.

* cited by examiner

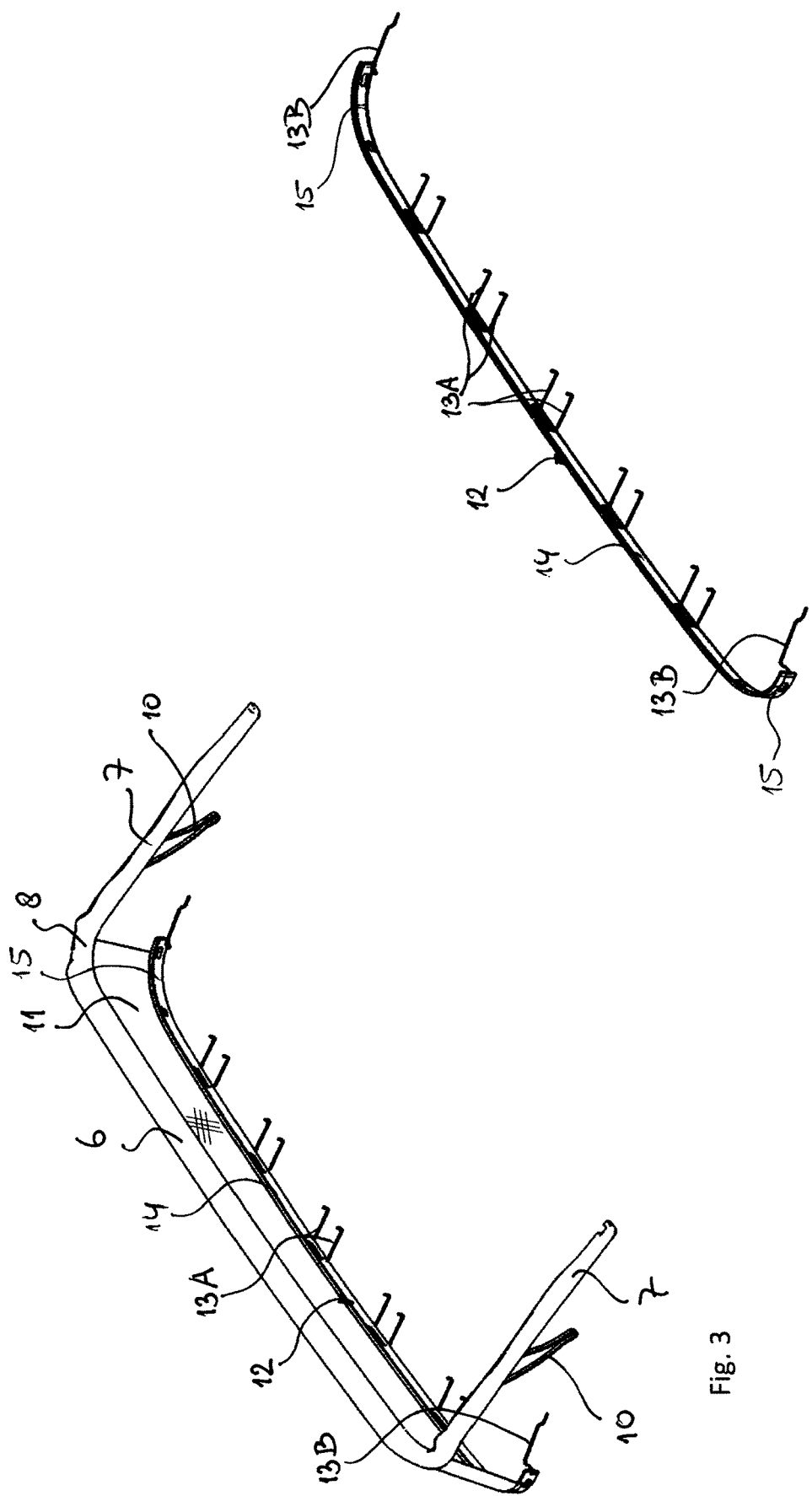

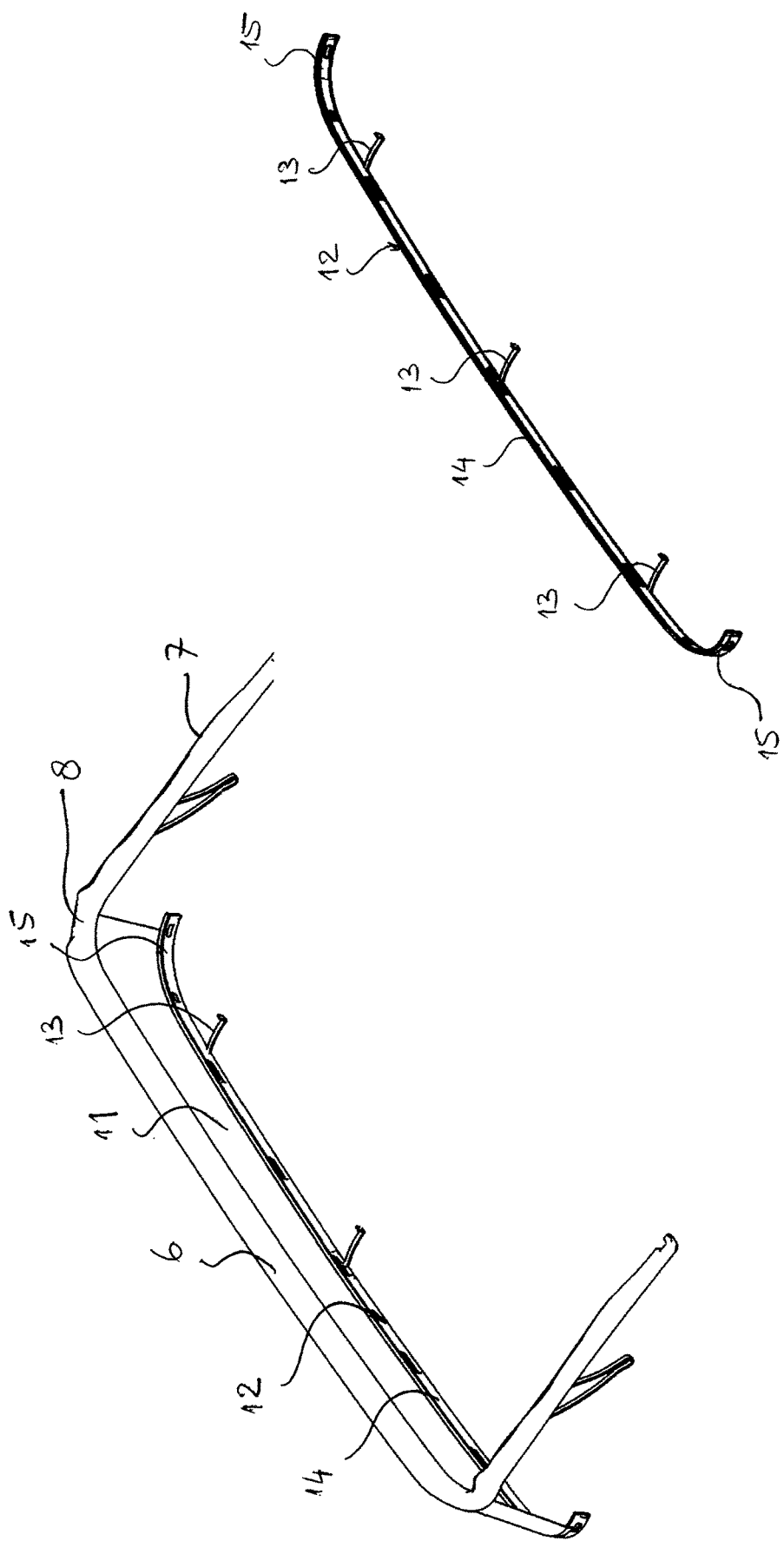

OPEN ROOF CONSTRUCTION FOR A VEHICLE AND WIND DEFLECTOR ASSEMBLY

BACKGROUND

The discussion below is merely provided for general background information and is not intended to be used as an aid in determining the scope of the claimed subject matter.

The invention relates to an open roof construction for a vehicle having a wind deflector assembly.

A known wind deflector assembly has a flexible member constructed as a rollo, i.e. the flexible member is windable at its lower edge onto a spring loaded winding roller. If the flexible member has side portions, there are provided two more winding rollers. This rollo structure enables the wind deflector assembly to take in different active positions, while keeping the flexible member tensioned at all times.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An open roof construction for a vehicle comprises a movable panel for selectively opening and closing a roof opening and a wind deflector assembly positioned at the front edge of the roof opening. The wind deflector assembly is provided with a substantially rigid upper frame member extending at least along the front edge of the roof opening and a flexible member connected with an upper edge to said upper frame member and with a lower edge to a stationary part of the open roof construction. The upper frame member is movable by an operating mechanism between a lower, inactive position and at least two upper, active positions. The flexible member is provided with tensioning members to keep it taut over its entire width in all active positions, and is provided with a substantially rigid, elongate lower frame member at its lower edge. The lower frame member is connected to the stationary part through the tensioning members having a maximum tension force which is substantially lower than a maximum operating force of the operating mechanism.

The substantially rigid lower frame member movably connected to the stationary part through the tensioning members can be very simple. The spring force is such that it will keep the flexible member taut, but will not disturb the operation of the wind deflector assembly.

The tensioning members may be bending springs which preferably extend from the elongate member substantially rearwardly as there is normally sufficient space for the bending springs in this part of the stationary part.

The bending springs may be leaf springs or wire springs, although other although other types of springs are not excluded, while different types of springs may be combined in one embodiment.

The spring members are preferably distributed along the length of the elongate member in order to evenly load the flexible member.

A very simple structure is obtained if the spring members are hooked into the stationary part and/or hooked into the elongate member. No separate fixing members are required then.

The operating mechanism of the wind deflector assembly may be electrically or mechanically operated. Both operating systems could be combined with the tensioning members as described.

Generally, the flexible member will comprise an air-permeable mesh material, but other materials will be conceivable.

Due to the present invention, it is possible that the elongate member is non-linear. For example, if the upper frame member has a main part extending substantially in transverse direction of the open roof construction and two arms extending mainly in longitudinal direction of the open roof construction, in which the arms are connected to the main part through a bend, the lower frame member may extend along the main part of the upper frame member and at least along a portion of the bends. It is no problem then to connect the tensioning members in any portion of the lower frame member.

An aspect of the invention also includes a wind deflector assembly presenting all the features of the wind deflector assembly as described above and being thus constructed and evidently intended for use in the open roof construction as described.

BRIEF DESCRIPTION OF THE DRAWINGS

Hereinafter aspects of the invention will be further elucidated while referring to the drawing. Herein:

FIG. 3 is a view corresponding to that of FIG. 2, but only showing the wind deflector assembly.

FIG. 4 is a view corresponding to that of FIG. 3, but only showing a lower frame part of the wind deflector assembly comprising tensioning members.

FIGS. 9 and 10 are views corresponding to those of FIGS. 3 and 4, but showing a second embodiment of the wind deflector assembly.

DETAILED DESCRIPTION OF THE ILLUSTRATIVE EMBODIMENTS

Figure 1:
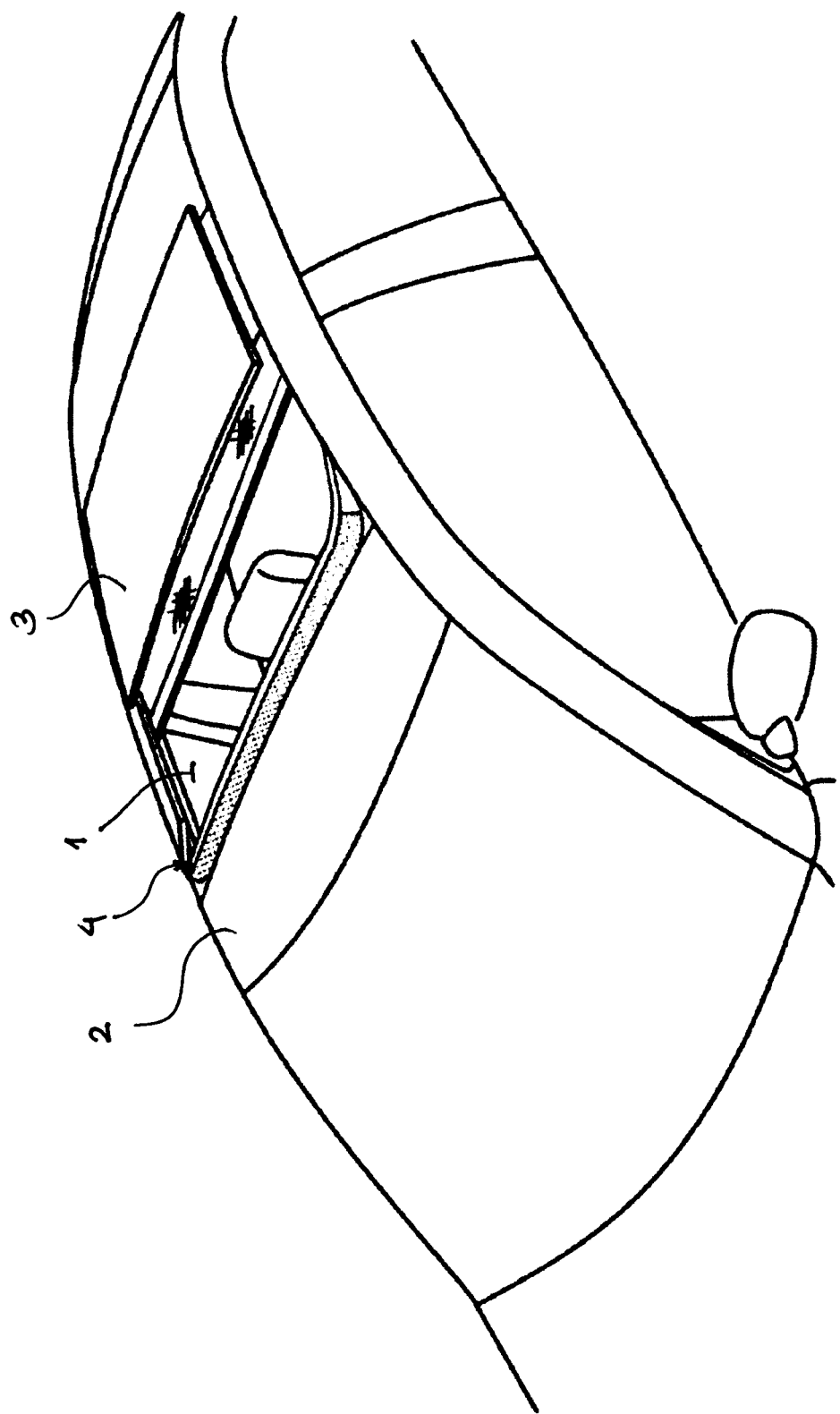
FIG. 1 is a schematic front perspective view of a vehicle roof comprising an embodiment of the open roof construction having a wind deflector assembly.
Figure 2:
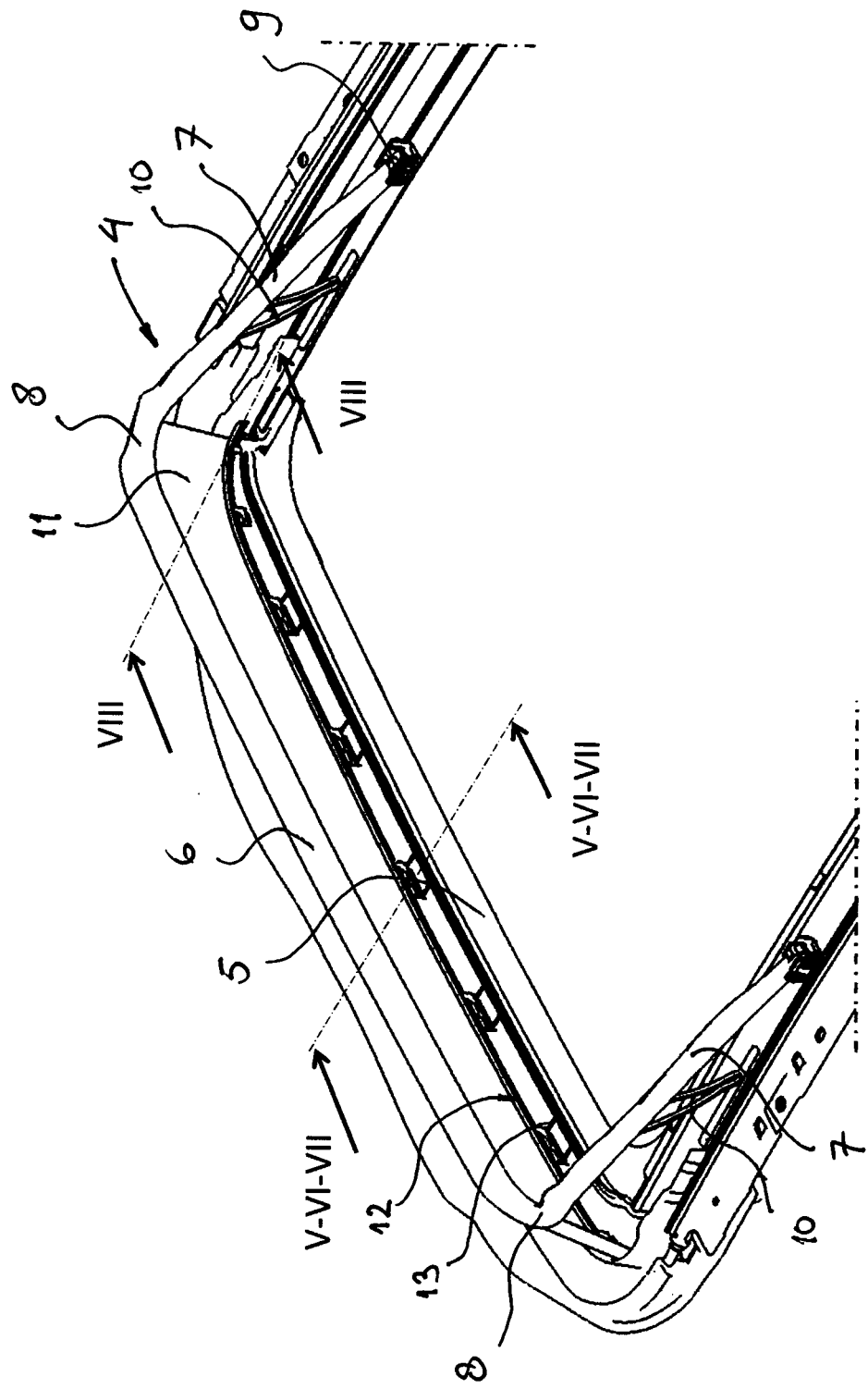
FIG. 2 is a rear perspective view of a front portion of the open roof construction of FIG. 1, in particular showing the wind deflector assembly.

Firstly referring to FIG. 1, an open roof construction for a vehicle comprises a roof opening 1 which is provided in a stationary roof part 2 of the vehicle. A movable panel 3 is provided for selectively opening and closing said roof opening 1. The manner in which the movable panel 3 is moved is known per se and thus will not be elucidated further within the context of this description. Generally, the panel will at least be slidable back and forth creating a passage adjacent the front edge of the roof opening 1.

At the front edge of the roof opening 1 a wind deflector assembly 4 is positioned. In the illustrated embodiment this wind deflector assembly 4 is movable between a retracted position (FIG. 5) and two or more extended positions (FIGS. 2, 3 and 6, 7). In the retracted position of the wind deflector assembly 4 the movable panel 3 can be moved to a forward position for closing the roof opening 1.

As is shown in FIGS. 2-8, the wind deflector assembly 4 is provided with an upper frame member 6. In the illustrated embodiment, in which the wind deflector assembly 4 can be moved between a retracted position and an extended position, arms 7 are attached to the upper frame member 6 through rounded corners 8 and are connected to the stationary part through at least pivots 9, which are possibly slidable. The upper frame member 6 includes a main part that extends transversely to a direction of movement of the movable panel 3, or generally parallel to a front edge of the roof opening 1. The arms 7 extend longitudinally in the direction of movement of the movable panel 3, or transversely to the front edge of the roof opening 1. It should be noted, however, that a movable wind deflector assembly 4 not necessarily has to pivot, but also could perform a translational movement between its retracted and extended positions.

In a way known per se an operating system (for example mechanically or electrically operated, here through spring members 10) is provided, which moves the wind deflector assembly 4 from the lower retracted position towards the higher extended position. For example, in the present embodiment, the wind deflector assembly 4 is held down in its retracted position by the movable panel 3 (when latter is in its closed position). When the movable panel 3 moves rearwardly towards its opened position (see for example FIG. 1) it will disengage arms 7 of wind deflector 4 which, forced by spring members 10, will move the upper frame member 6 towards its extended position. In a reverse order, when the movable panel 3 is moved towards its closed position, it will engage arms 7 of the extended wind deflector 4 and urge it towards its retracted position against the load defined by spring members 10. Through a separate electric drive or a mechanical system actuated by the operating mechanism for the panel (not shown, but known per se), the height position of the upper frame member 6 could be changed, for example depending on the speed of the vehicle.

A flexible member 11, in the illustrated embodiment an air-permeable mesh material, is attached with one edge (its upper edge) to the upper frame member 6. In the illustrated embodiment, the edge of the flexible member 9 remote from the upper frame member 6 (i.e. its lower edge) is attached to a lower frame member 12 which, in the illustrated embodiment, is a strip which is at least substantially rigid against bending around a longitudinal axis. The lower frame member 12 can have any structure, but will generally be elongate in transverse direction of the open roof construction. The lower frame member 12 is connected to a stationary part 5 through tensioning members 13, such that the lower frame member 12 could be moved in upward direction against the force of tensioning members 13. This ensures that if upper frame member 6 is moved to different extended positions flexible member 11 can be kept taut because lower frame member 12 can move along against the load of tensioning members 13. In the lowest active position of wind deflector assembly 4 (cf. FIG. 6), flexible member 11 will already be kept taut and if upper frame member 6 is moved to a higher active position (see FIG. 7), lower frame member 12 will move along and tensioning members 13 will be loaded so as to load lower frame member 12 in downward direction.

FIGS. 3 and 4 show that a plurality of tensioning members 13 is distributed along the length of lower frame member 12. In fact, in this particular embodiment, there are two types of tensioning members 13, first tensioning members 13A in a central main portion 14 of the lower frame member 12 and second tensioning members 13B at the lateral ends where lower frame member 12 is bent into corner areas 15. First and second tensioning members 13A,B extend from lower frame member 12 rearwardly. For the sake of completeness it is noted that lower frame member 12 is not only bent in its end portions, but also main portion 14 is slightly curved depending on the curvature of the front edge of roof opening 1. Upper frame member 6 including the rounded corners 7 has a similar curvature.

Figure 11:
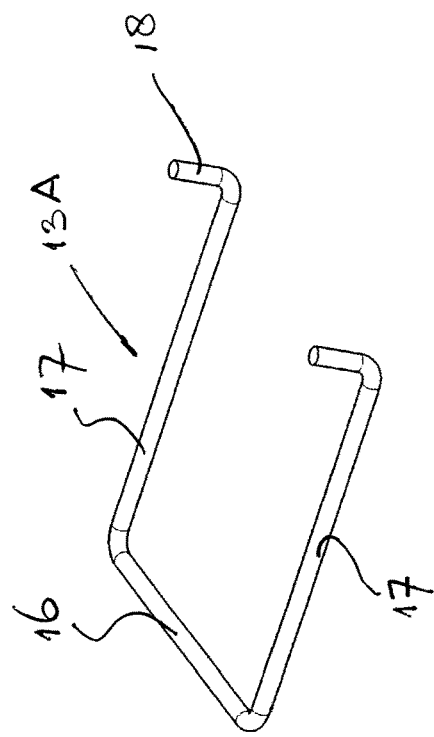

FIG. 11 show first tensioning member 13A of FIGS. 3 and 4 on a larger scale. It is made from steel wire and bent into a U-shape having a web 16 and two legs 17. Each leg 17 has an upright foot 18 that can be hooked into an opening 19 the stationary part 2, here the front beam of the frame (see FIGS. 5-7). The web 16 of first tensioning member 13A can be hooked into openings (not shown) in lower frame member 12 of wind deflector. First and second tensioning members 13A and 13B act as a bending spring.

Figure 7:
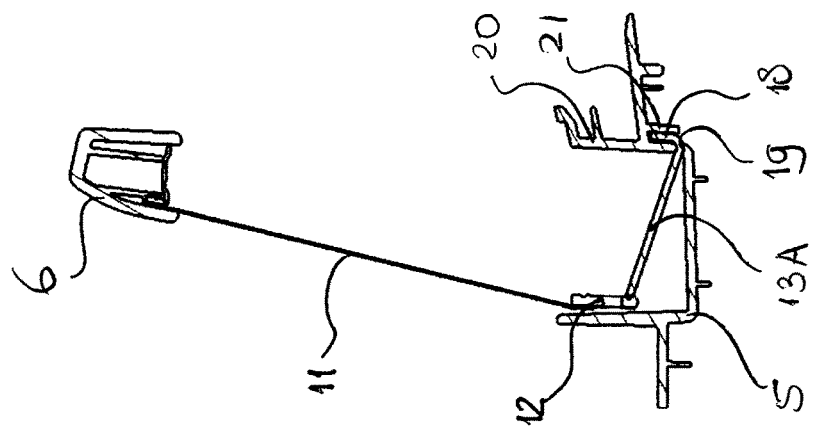
FIGS. 5, 6 and 7 are cross-sectional views along lines V-VI-VII to V-VI-VII in FIG. 2, showing the wind deflector in 3 different positions.
Figure 6:
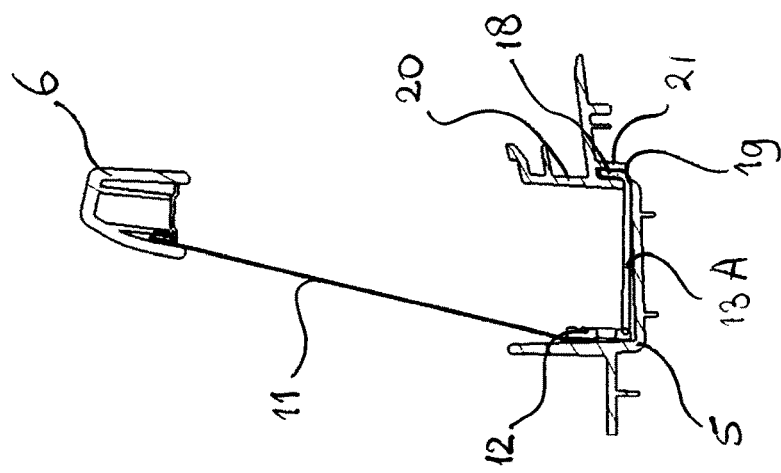
Figure 5:
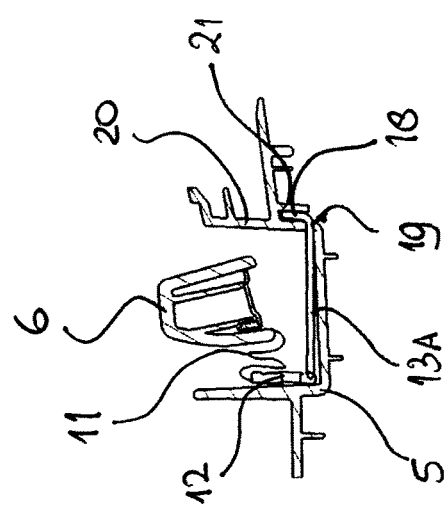

FIGS. 5-7 show how first tensioning member 13A is mounted to an upright wall 20 of stationary part 5 and to lower frame member 12. Feet 18 of legs 17 are fitted between wall 20 and a vertical flange 21 so that they cannot rotate thereby causing legs 17 to bend with respect to feet 18 when lower frame member 12 with one end of tensioning members 13A is moved upwardly. They also show how first frame member 6 of wind deflector assembly 4 is moved from the lower retracted position (FIG. 5) to a first extended position (FIG. 6) in which tensioning members 13A are hardly loaded and to a second, higher extended position (FIG. 7) in which lower frame member 12 is moved upwardly by upper frame member 6 and flexible member 11 against the spring force of loaded tensioning members 13A. If first frame member 6 is moved to a lower position again, tensioning members 13A will move lower frame member 12 downwardly again so as to maintain the relative distance between frame members 6 and 16 as long as wind deflector assembly 4 is in one of its extended positions.

Figure 8:
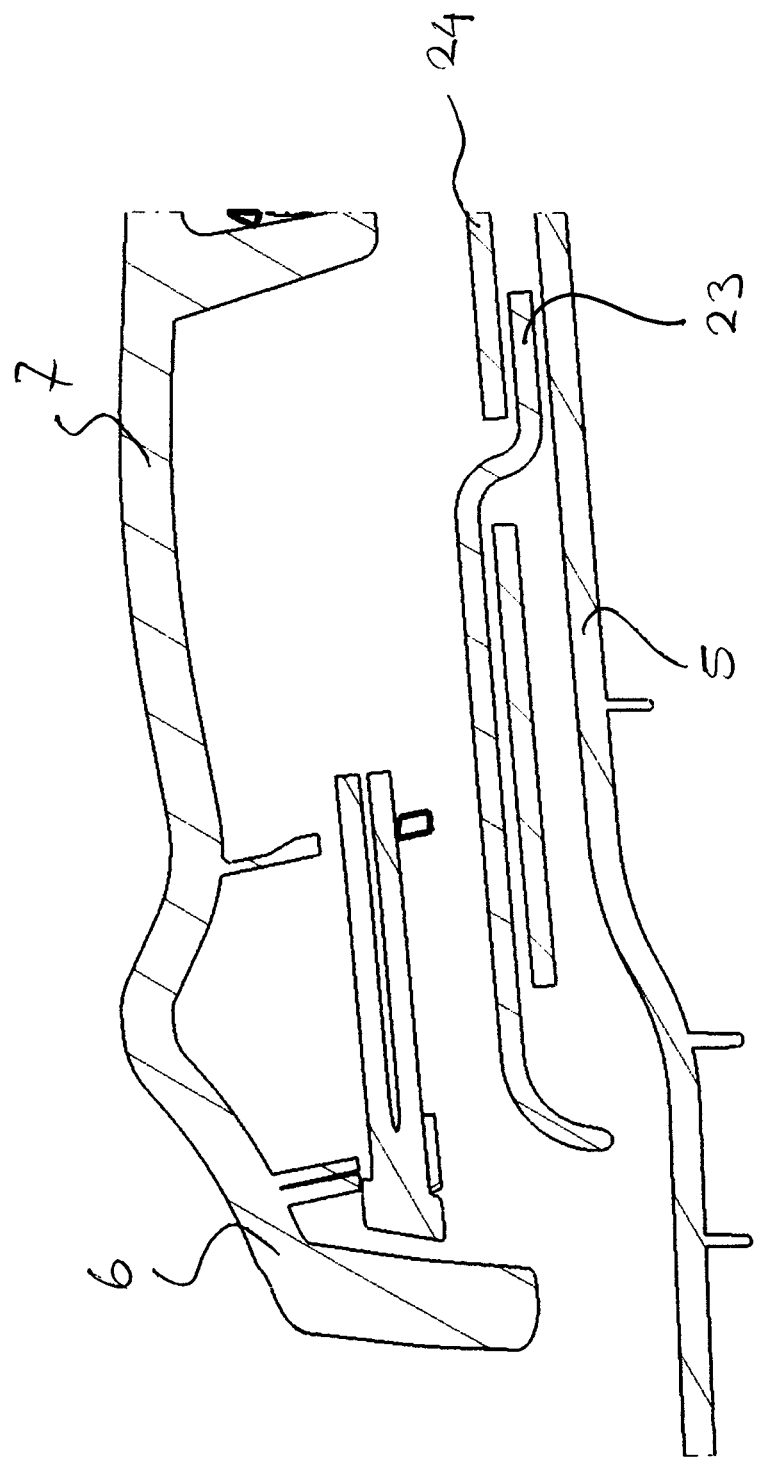
FIG. 8 is an enlarged cross-sectional view along line VIII-VIII in FIG. 2, but with the wind deflector in the position according to FIG. 5.
Figure 12:
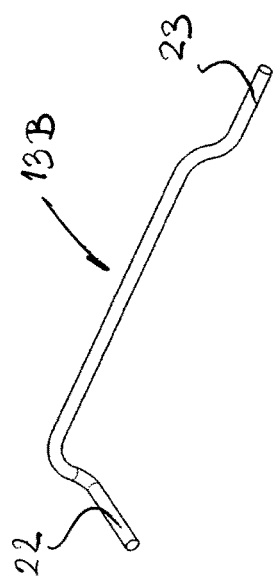
FIGS. 11 and 12 are enlarged perspective views of tensioning members as used in the embodiment of FIGS. 3 and 4.

FIGS. 8 and 12 show second tensioning member 13B in mounted position and separately. Second tensioning member 13B is a single wire having on its front end a hook 22 for insertion into lower frame member 12 and having on its rear end a hook 23 for insertion in the bottom wall of a guide rail 24 of the operating mechanism for panel 3.

Figure 13:
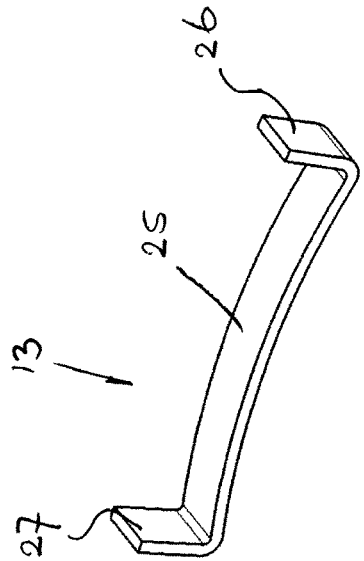
FIG. 13 is a view corresponding to that of FIG. 11, but showing a tensioning member from the embodiment of FIGS. 9 and 10.

FIGS. 9, 10 and 13 show a second embodiment of the wind deflector assembly 4, in which tensioning members 13 are constructed as leaf springs. The drawings show 3 leaf springs in main portion 14 of wind deflector assembly 4, but other numbers and distributions are conceivable. A spring 13 could also be arranged at rounded corner areas 15 of lower frame member 12. It is noted that flexible member 11 could also be extended to positions below arms 7. Lower frame member 12 will then be extended as well and additional tensioning members 13 could be positioned in those areas.

FIG. 13 shows a first tensioning member 13A constructed as a leaf spring in detail. As is shown first tensioning member 13A has a main body portion 25 having a convex shape so as to be preloaded. Both ends of the leaf spring are provided with hooks 26, 27 the rear 26 for hooking into upright wall 20 of stationary part 5 and front hook 27 for hooking into lower frame member 12.

In general it is noted that the total force of the plurality of tensioning members 13 should be strong enough to keep flexible member 11 taut but should be weak enough not to effectively influence the operational force on upper frame member 6. The operational force for upper frame member 6 could e.g. range between 14 and 20 N. Tests have shown that a force on lower frame member 12 of around 2-3 N in the lower extended position and around 3-4 N in the highest extended position meets both requirements. It is further noted that varying wind forces during driving will lead to movements of lower frame member 12, which has the advantage that upper frame member 6 will better keep its position. The invention is not limited to the embodiment described before, which may be varied widely within the scope of the invention as defined by the appending claims. Aspects of different embodiments may be combined. The flexible member may not only be made from air permeable mesh material, but may also be partly non-permeable. Flexibility may be obtained through the material, but also by means of the construction, for example through pivotable parts. The tensioning members may also be formed by other spring types, such as pull springs. The lower frame member may also be connected to the stationary part through a stretchable part, for example stretchable mesh material or other e.g. rubber-like material forming the tensioning member. The lower frame member and the one or more tensioning members can also be integrated.

What is claimed is:

1. A wind deflector assembly for an open roof construction for a vehicle having a stationary roof part with a roof opening and a movable panel configured to selectively open and close the roof opening, the wind deflector assembly comprising:
   a substantially rigid upper frame member configured to extend at least along a front edge of the roof opening;
   a flexible member connected with an upper edge to the substantially rigid upper frame member and with a lower edge configured to be attached to the stationary roof part, the flexible member including one or more tensioning members configured to keep the flexible member taut over its entire width in all active positions;
   an operating mechanism configured to move the substantially rigid upper frame member between a lower, inactive position and at least two upper, active positions; and
   wherein the flexible member is provided with a substantially rigid, movable, elongate lower frame member at its lower edge, wherein the lower frame member is configured to be movably connected to the stationary roof part through the one or more tensioning members having a maximum tension force which is substantially lower than a maximum operating force of the operating mechanism.

2. The wind deflector assembly according to claim 1, wherein the tensioning members are bending springs.

3. The wind deflector assembly according to claim 2, wherein the tensioning members extend from the lower frame member substantially rearwardly toward a rear edge of the roof opening.

4. The wind deflector assembly according to claim 2, wherein the tensioning members are leaf springs or wire springs.

5. The wind deflector assembly according to claim 4, wherein each leaf spring is preloaded for assuming a convex shape.

6. The wind deflector assembly according to claim 1, wherein the tensioning members are distributed along a length of the lower frame member.

7. The wind deflector assembly according to claim 1, wherein the tensioning members are hooked into the stationary roof part and/or hooked into the lower frame member.

8. The wind deflector assembly according to claim 1, wherein the operating mechanism of the wind deflector assembly is electrically or mechanically operated.

9. The wind deflector assembly according to claim 1, wherein the flexible member comprises an air-permeable mesh material.

10. The wind deflector assembly according to claim 1, wherein the lower frame member is non-linear.

11. The wind deflector assembly according to claim 10, wherein the upper frame member has a main part extending substantially in a transverse direction of movement of the panel and two arms extending mainly in a direction of movement of the panel, the arms being connected to the main part through a rounded corner, the lower frame member configured to extend along the main part of the upper frame member and at least along a portion of the rounded corners.

12. An open roof construction for a vehicle, comprising:
    a stationary roof part of the vehicle having a roof opening;
    a movable panel configured to selectively open and close the roof opening;
    a wind deflector assembly positioned at a front edge of the roof opening, the wind deflector assembly comprising:
      a substantially rigid upper frame member extending at least along a front edge of the roof opening;
      a flexible member connected with an upper edge to the substantially rigid upper frame member and with a lower edge to the stationary roof part, the flexible member including one or more tensioning members configured to keep the flexible member taut over its entire width in all active positions;
      an operating mechanism configured to move the substantially rigid upper frame member between a lower, inactive position and at least two upper, active positions; and
      wherein the flexible member is provided with a substantially rigid, movable, elongate lower frame member at its lower edge, said lower frame member being movably connected to the stationary roof part through the one or more tensioning members having a maximum tension force which is substantially lower than a maximum operating force of the operating mechanism.

13. The open roof construction according to claim 12, wherein the tensioning members are bending springs.

14. The open roof construction according to claim 13, wherein the tensioning members are leaf springs or wire springs.

15. The open roof construction according to claim 14, wherein each leaf spring is preloaded for assuming a convex shape.

16. The open roof construction according to claim 12, wherein the tensioning members extend from the lower frame member substantially rearwardly toward a rear edge of the roof opening.

17. The open roof construction according to claim 12, wherein the tensioning members are distributed along a length of the lower frame member.

18. The open roof construction according to claim 12, wherein the tensioning members are hooked into the stationary roof part and/or hooked into the lower frame member.

19. The open roof construction according to claim 12, wherein the operating mechanism of the wind deflector assembly is electrically or mechanically operated.

20. The open roof construction according to claim 12, wherein the flexible member comprises an air-permeable mesh material.

* * * * *